(12) United States Patent
Liu

(10) Patent No.: US 6,845,149 B2
(45) Date of Patent: Jan. 18, 2005

(54) METHOD FOR FREQUENCY AND LOOP LENGTH GROUPING FOR CROSS-TALK REDUCTION IN A PLURALITY OF DSL CHANNELS

(75) Inventor: Dongtai Liu, Fremont, CA (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 10/704,938

(22) Filed: Nov. 10, 2003

(65) Prior Publication Data

US 2004/0096052 A1 May 20, 2004

Related U.S. Application Data

(60) Provisional application No. 60/425,791, filed on Nov. 12, 2002.

(51) Int. Cl.⁷ .................................................. H04M 1/24
(52) U.S. Cl. ..................... 379/24; 379/1.03; 379/27.01; 379/417
(58) Field of Search ........................... 379/413, 413.01, 379/417, 416, 1.01, 1.03, 22.08, 24, 30, 27.01, 9

(56) References Cited

U.S. PATENT DOCUMENTS

| 5,668,802 A | 9/1997 | Chalmers et al. |
| 6,229,855 B1 | 5/2001 | Takatori et al. |
| 6,697,487 B1 | 2/2004 | Getchell |

*Primary Examiner*—Rexford Barnie
(74) *Attorney, Agent, or Firm*—Felix L. Fischer (57) ABSTRACT

A system and method of communicating between a central office and a plurality of subscriber sites. Subscriber sites are separated into frequency groups. Each group spans a distance along the cable such that no more than a predetermined amount of attenuation is required to equalize the signal power of signals sent from a site in the group. Frequency groups closer to the central office are assigned higher frequency bands than frequency groups farther away from the central office. The central office includes a plurality of filters, each of which has a passband for passing the frequency band of a group and a stop band that substantially attenuates the frequencies of the other groups. The frequency group nearest the central office has no filter. The passband of a filter may also provide any needed attenuation to assure that signals arriving at the central office have approximately the same power levels.

6 Claims, 10 Drawing Sheets

FIG. 1

PAIR UNIT

FIG. 2a

BINDER GROUP

FIG. 2c

MULTIUNIT

METHOD FOR FREQUENCY AND LOOP LENGTH GROUPING FOR CROSS-TALK REDUCTION IN A PLURALITY OF DSL CHANNELS

CROSS-REFERENCE TO RELATED APPLICATIONS

This application claims priority of the Provisional Application Ser. No. 60/425,791 of the same title filed on Nov. 12, 2002.

FIELD OF THE INVENTION

The present invention relates generally to control of noise in a multi-conductor cable, and more particularly controlling crosstalk noise in a multi-conductor DSL distribution cable.

DESCRIPTION OF THE RELATED ART

A telephone company provides telephone voice service from a central office (CO) to customer premises equipment (CPE) via a multiconductor feeder cable. Distribution cable pairs connect from the feeder cable to each CPE site at which the feeder cable is spliced to connect the distribution cable pairs. Splices may also occur at various points such as every 500 feet along the feeder cable. One study showed that the average subscriber loop in the United States has 22 splices.

Figure 1:
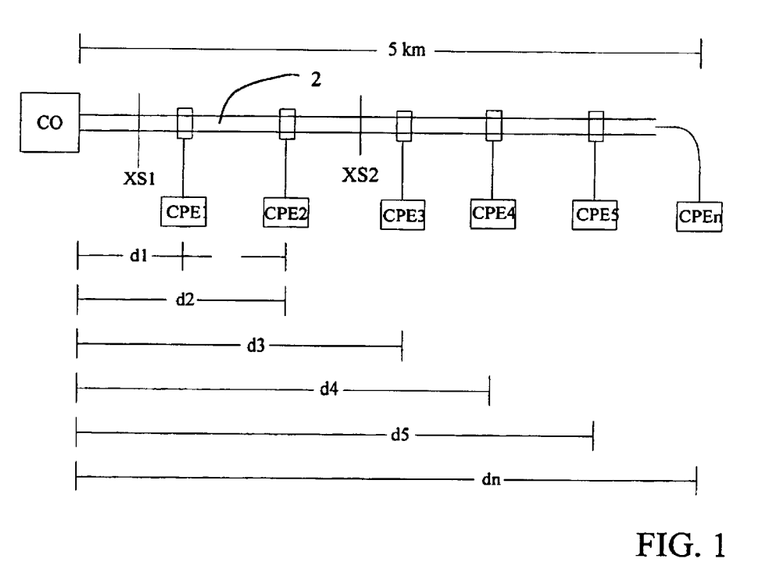
FIG. 1 illustrates an exemplary distribution of PSTN subscriber loops to several CPEs.

FIG. 1 illustrates an exemplary distribution of PSTN subscriber loops to several CPEs, CPE1-N. A typical length of the feeder cable is 5 kilometers (km) (about 15,000 ft) from the CO or a remote terminal (RT) with 26-gauge wire. In the illustration, CPE1 is a distance d1 from the CO, CPE2 is a distance d2. Distances d3, d4, d5 and d6 for CPE3, CPE4 CPE5 and CPE6 similarly shown.

Figures 2A, 2B, 2C:
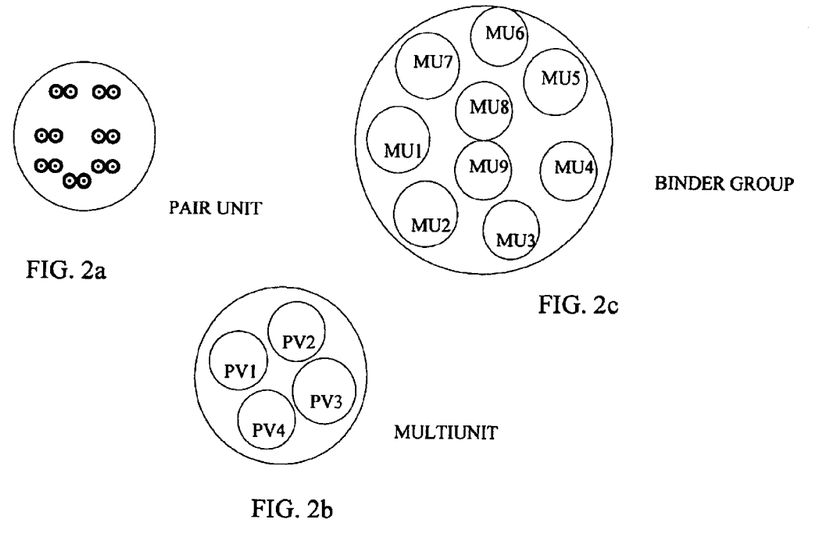
FIG. 2 illustrates an exemplary feeder cable configuration.

FIG. 2 illustrates an exemplary feeder cable configuration. The cable is typically a multi-conductor cable contained in a common sheath which may or may not contain an overall shield. Selected pairs of conductors are twisted together to provide a degree of shielding from other twisted pairs in the cable. It is quite common for such a cable to have no metallic shield around each of the twisted pairs, meaning that the twisting of the pairs offers the only protection against noise from the other twisted pairs.

A common arrangement of the multiple pairs of wire in the cable is the grouping of pairs into pair units that each includes 12 or 13 pairs. These pair units are then combined into a multiunit. A common multiunit is a 50-pair multiunit that has two 13-pair units and two 12-pair units. When a pair unit or multiunit is assembled and bound with a colored binder tape it is referred to as a binder group, as shown.

Figure 3A:
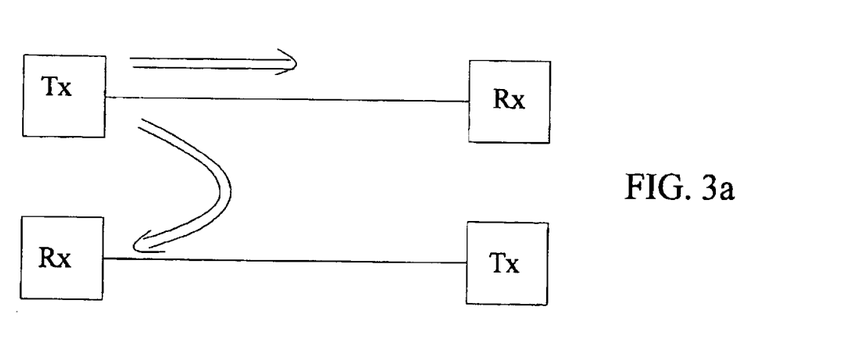
FIG. 3 illustrates the mechanism by which near and far end crosstalk is induced.
Figure 3B:
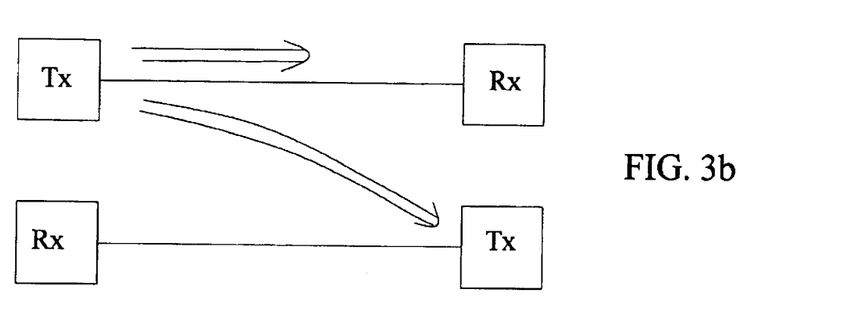

Because pairs in the cable that carry significant energy are close together, crosstalk is induced between the adjacent pairs, even though the pairs are twisted. Commonly, two kinds of crosstalk are considered, near-end crosstalk (NEXT) and far-end crosstalk (FEXT), as shown in FIGS. 3a and 3b, respectively. Near-end crosstalk occurs when a transmitter interferes with a receiver immediately adjacent the transmitter. Far-end crosstalk occurs when a transmitter interferes with a receiver at some distance from the transmitter.

One technique for minimizing crosstalk is to place the wires that are the source of the interference into a binder group that is separate from the binder group containing the susceptible wires. In practice, this technique does not work well, because binder group relationships are not maintained throughout the run of the cable. The binder group relationships that held in one section of the cable do not necessarily hold in the adjacent sections of the cable, when the sections are joined by splices. Splices occur at a point where cable pairs are separated from the bundle to feed a customer's premises and at various points along the cable because long cables must be joined from many shorter cables. Also, a cable with many pairs at the central office becomes progressively smaller as the cable pairs are separated from the bundle. Eventually, the pairs in the cable that were separated into different binder groups become adjacent to each other as the number of pairs in the cable decreases.

Figure 4:
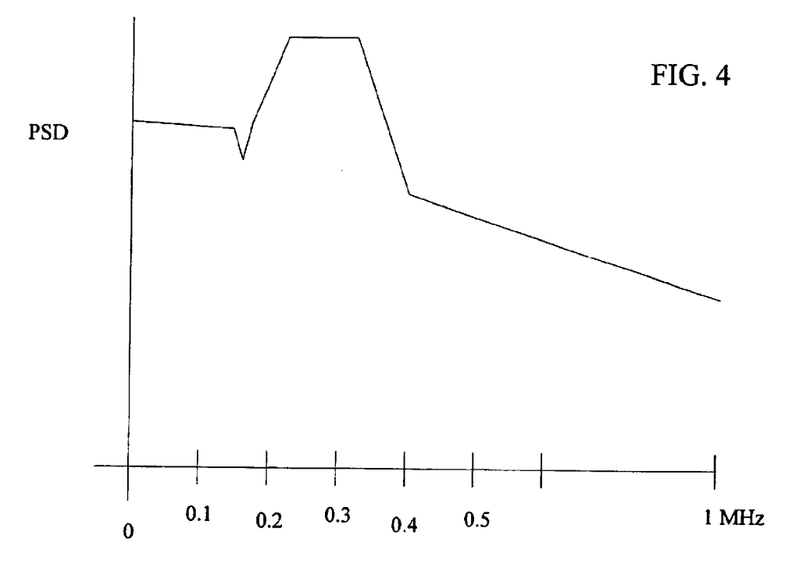
FIG. 4 shows a power spectral density mask.

Another technique for handling crosstalk is to use power spectral density masks, as shown in FIG. 4. This mask defines the acceptable power levels for the entire frequency range of the signal carried on a pair of wires. Signals in a higher frequency band are prohibited according to the mask from having high power levels to prevent these signals from interfering with the lower frequency signals. Use of the mask may diminish the performance of the system because higher frequencies either cannot be used or have a limited loop reach.

Yet another technique for handling crosstalk is to assure that new loop technologies are compatible with each other if they are in the same binder group. This technique puts strict limits on the technologies that can co-exist in a cable bundle, thereby limiting the customers' choice of technologies.

The above techniques are thus either not compatible or inefficient in a high-speed time division duplexing system (TDD). For DSL distribution systems it is desirable to provide cross talk reduction which does not limit the loop reach or performance of the system.

BRIEF SUMMARY OF THE INVENTION

The present invention provides cross talk reduction in DLS distribution systems having numerous multipair subscriber loop cables. A method, in accordance with the present invention, includes a method of communication between a plurality of subscriber sites and a central office via a multipair subscriber loop cable that carries signals between the central office and the sites. The method includes separating a plurality of subscriber loop pairs into a plurality of frequency groups, where each frequency group spans a distance along the cable that requires no more than a predetermined range of power attenuation to be applied to the signals from the sites within the group to equalize signal power from each site within the group. The method further includes assigning frequency bands to the frequency groups such that groups farther from the central office have lower frequency bands than groups closer to the central office and assigning a filter at the central office for each frequency group, where each filter has a passband that provides any needed attenuation to the signals of the frequency group and a stopband that substantially attenuates frequencies from the other frequency groups. In some cases, the frequency group closest to the central office will not require a filter. The method further includes transmitting a signal from a site within a frequency group, where the signal has a power attenuation based on its position within the group, and a frequency within the frequency band assigned to the group and receiving the signal from the site within the frequency group by applying the filter assigned at the central office to the signal.

A system in accordance with the present invention includes a multipair subscriber loop cable for carrying signals between the central office and the plurality of subscriber sites, where the plurality of subscriber sites is separated into a plurality of frequency groups, and the frequency groups nearer to the central office have a higher frequency band than frequency groups farther from the central office. Each frequency group spans a distance along the cable that requires no more than a predetermined range of power attenuation to be applied to the signals from the sites within the group to substantially equalize signal power from each site within the group. The system further includes a plurality of filters for use in the central office, where each of the plurality of frequency groups, except, in certain cases, the frequency group closest to the central office, has a filter with a stopband that substantially attenuates frequencies from the other frequency groups and a passband that passes frequencies of the group. The passband of the filter provides any needed attenuation to the signals of the frequency group so that signals from any frequency group have approximately equal signal power at the central office. The system further includes a transmitter at each site, where the transmitter includes an attenuator for attenuating transmit power depending on the position of the site within a frequency group such that the transmit power from each site within the group is approximately equal.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Referring to FIG. 1, a rule that minimizes crosstalk throughout a feeder cable 2 is that power levels at any cross section, such as xs1 or xs2, of the cable should be approximately equal. Crosstalk is reduced because coupling between a source pair and a target pair is guaranteed to be much less than the signal power on the target pair, making signal recovery on the target pair possible, at least in theory.

However, this rule is difficult to meet when similar transmitters at each CPE site transmit with full power, which may be about 1 W. This amount of power is needed by the most distant CPE because of the attenuation of the cable when the CPE is located many thousands of feet from the receiver and it is highly desirable for each CPE to have the same power capability. For example, referring to FIG. 1, if the distance $d_n$ between $CPE_N$ and the CO is such as to cause an attenuation of 60 dB, then the power at the receiver at the CO is 1 microwatt, when the $CPE_N$ transmits with 1 Watt. According to the above-stated rule, this requires that all signals in the cable at the xs1 point have a power level of about 1 microwatt. However, when $CPE_1$ transmits to the CO, its power level is 1 Watt causing some of the signals at the xs1 point to have close to $10^6$ times the power as the signal from $CPE_N$, obviously violating the stated rule, and creating a large amount of far-end crosstalk.

Figure 5:
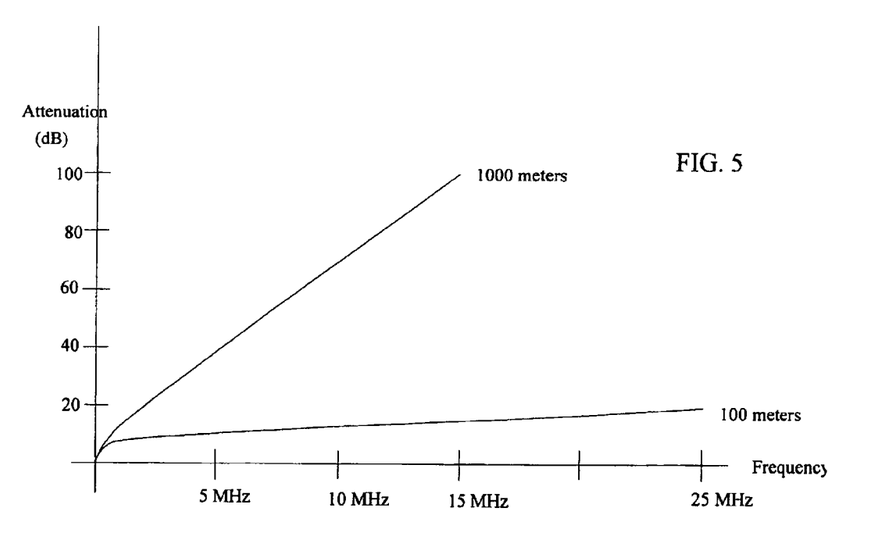
FIG. 5 shows power attenuation required to minimize crosstalk for a twisted pair cable as a function of frequency.
Figure 6:
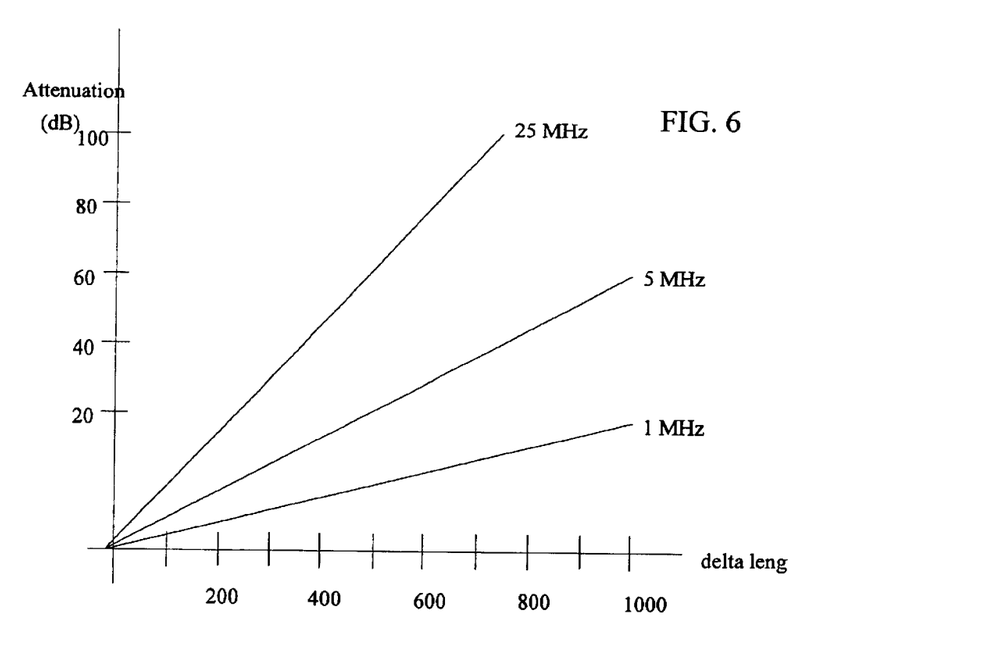
FIG. 6 shows power attenuation required to minimize crosstalk for a twisted pair cable as a function of distance.

A partial solution to this problem, in accordance with the present invention, is to require CPEs that are separated by a large distance from other CPEs reduce their transmit power so as to not overwhelm the small signal of the distant CPE. FIGS. 5 and 6 show power attenuation required for a twisted pair cable as a function of frequency and distance to minimize crosstalk. FIG. 5 suggests, for example, that if the distance between two CPEs is 1000 meters (the delta distance), then, at a frequency of 5 megahertz (MHz), the power reduction should be about 60 dB. Meeting the requirements shown in these charts would meet the above-stated rule and minimize crosstalk. To illustrate this consider the xs2 point, in FIG. 1, on the cable and assume that the distance between $CPE_2$ and $CPE_N$, operating with a 5 MHz bandwidth, is about 500 meters. According to FIG. 6, $CPE_2$ must reduce its transmit power by about 30 dB to prevent its transmitter from overwhelming the signal from $CPE_3$. If there are any CPEs between $CPE_2$ and $CPE_N$ in FIG. 1, then the power reduction required with respect to $CPE_2$ is less than 30 dB. If, on the other hand, the distance between $CPE_2$ and $CPE_N$ is 1000 meters then the required power reduction is much greater, about 60 dB.

Thus, if the power reductions of FIGS. 5 and 6 could be carried out, then the rule of equal power levels at a cross-section point of the cable is met and the system has acceptable crosstalk. Unfortunately, it is not practical to reduce the power level of a transmitter by more than 30 dB, which limits the distance over which the power attenuation is to be carried out. The 30 dB reduction causes a transmitter to have a power level of about 1 milliwatt. At an impedance of about 100 ohms for a subscriber loop, this power level permits only about 3 milliamperes (mA) to flow on the line.

Therefore, in accordance with the present invention, in addition to attenuating power at a CPE site depending on the distance between that site and other CPE sites, CPEs are organized into frequency groups. A frequency group includes a number of CPE sites which span a distance that requires no more than say a 30 dB power reduction. In the example given above, this means that a frequency group operating with at a maximum frequency of 5 MHz, spans a distance of 500 meters. CPEs outside of this distance operate in a different frequency band.

Figure 7:
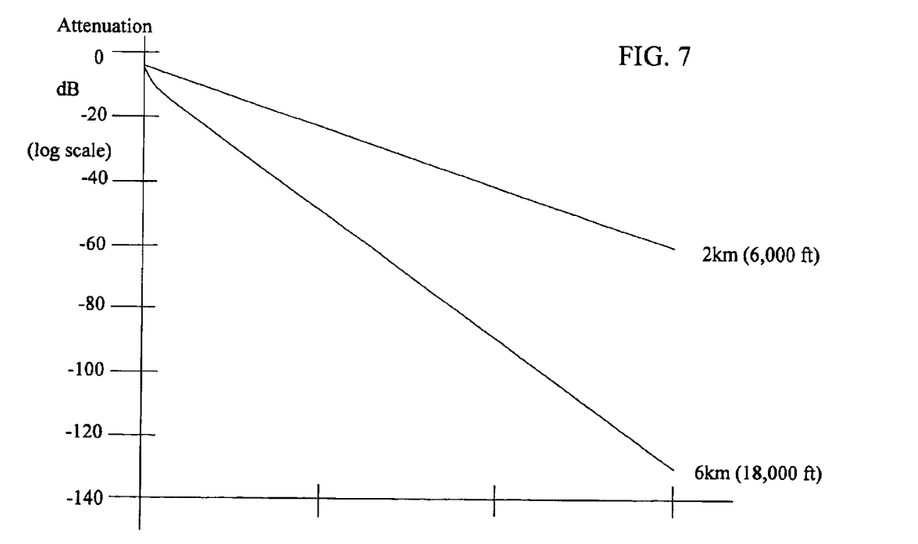
FIG. 7 shows the attenuation of a twisted pair cable as a function of frequency at 2 kilometers and 6 kilometers.
Figure 8:
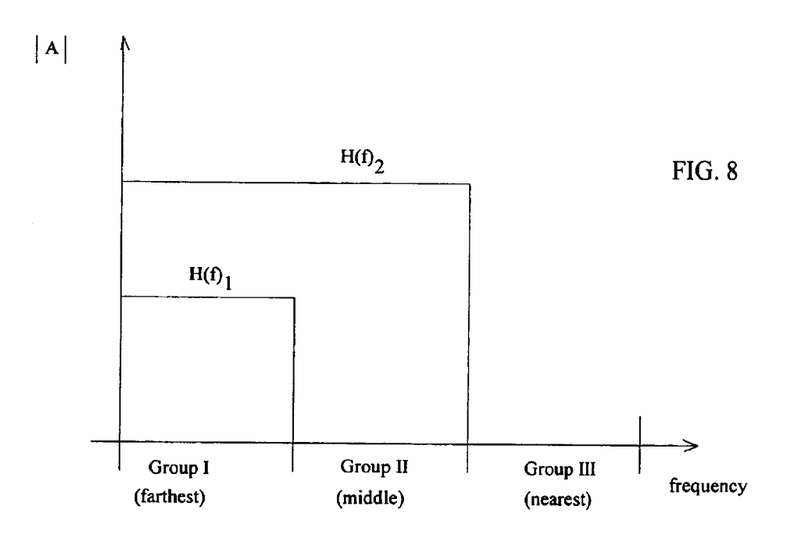
FIG. 8 shows a division of CPEs into frequency groups according to the present invention.

Furthermore, in accordance with the present invention, frequency bands are assigned to take advantage of the attenuation characteristics of the cable. These characteristics are illustrated in FIG. 7, which shows that, at a given frequency, attenuation is a direct function of distance. Thus, groups that are closer to the CO are assigned a higher frequency band than groups farthest from the CO. FIG. 8 shows the band assignment for the groups. For example, if a group operating with a 5 MHz bandwidth, spans 500 meters and the most distant CPE is 1500 meters from the CO, then division into three groups is possible. Group III, the nearest group, is assigned the highest frequency band, say 2.5 MHz to 5 MHz. Group II the middle group is assigned the middle band, say from 1 MHz to 2.5 MHz, and Group I, the farthest group is assigned the lowest frequency band, 0.1 to 1 MHz. Thus, when group III CPEs transmit, the power levels of their signals are reduced by the natural attenuation of the cable for the frequency band of the group. This helps to assure that signals transmitted from the farthest group have power levels that approximately match the power levels of the signals from the nearest group. A typical attenuation characteristic for 26 AWG feeder cable is about 6 dB per 100 meters at 5 MHz and about 2.7 dB per 100 meters at 1 MHz. If the farthest signal from the farthest group travels about 1500 meters to the CO, this signal is diminished by approximately 40 dB, whereas when the farthest signal from the nearest group travels 500 meters to the CO, the signal is diminished by approximately 30 dB. This frequency dependent attenuation helps to assure that signals in the closest group do not overwhelm signals from the farthest group.

Figure 9:
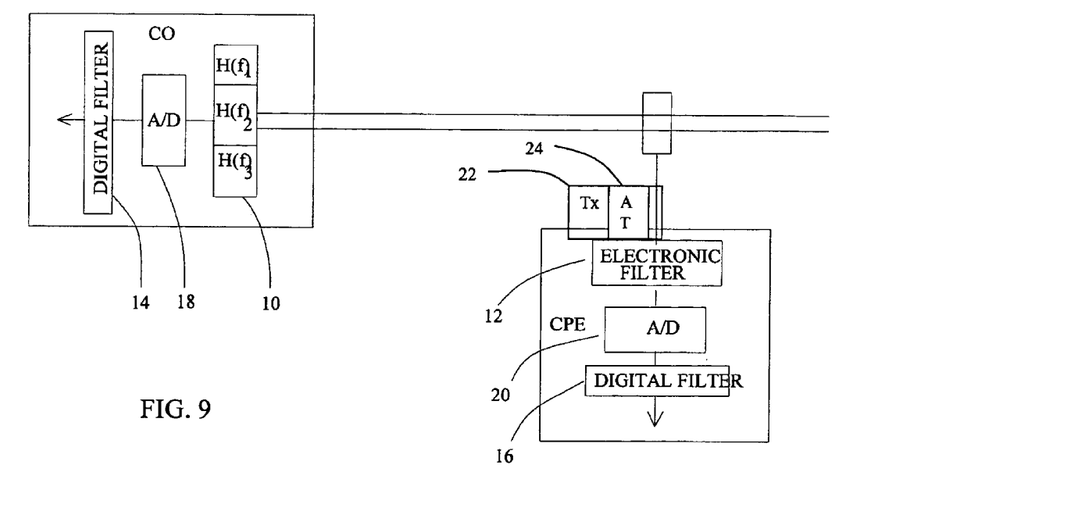
FIG. 9 shows the filtering elements contemplated by the present invention for an exemplary frequency group and the CO connection for that group; and, FIG. 10 shows a three group system according to the frequency groups of FIG. 8.

To enforce the frequency groups, a set of electronic filters 10 is employed in the CO and a filter 12 is employed in each of the CPEs as shown in FIG. 9. Additionally, more effective digital filters, 14 and 16, are used on each side after A-to-D converters, 18 and 20 respectively. When the CO listens to the far group of CPEs, the CO uses a low pass filter $H_1(f)$ to greatly attenuate the higher frequencies from the near and middle group. When the CO listens to the middle group of CPEs, it uses a low pass filter $H_2(f)$ to greatly attenuate the frequencies from the near group. When the CO listens to the near group, the crosstalk signal from a nearer member of the group (thus having higher frequencies) is attenuated by the electronic filter before A-to-D conversion. Crosstalk is much more severe at higher frequencies than lower frequencies; therefore, the electronic filter is required to suppress the crosstalk from the higher frequency groups so they don't become dominate over the received signal and the A-to-D converter's dynamic range is saved for the useful, in-band signal. A more effective digital filter can then be used after the A-to-D to completely remove the unwanted crosstalk signals. The transmitter 22 of each CPE has an attenuator circuit 24 which is adjustable based on distance from the CO and the frequency group.

Figure 10:
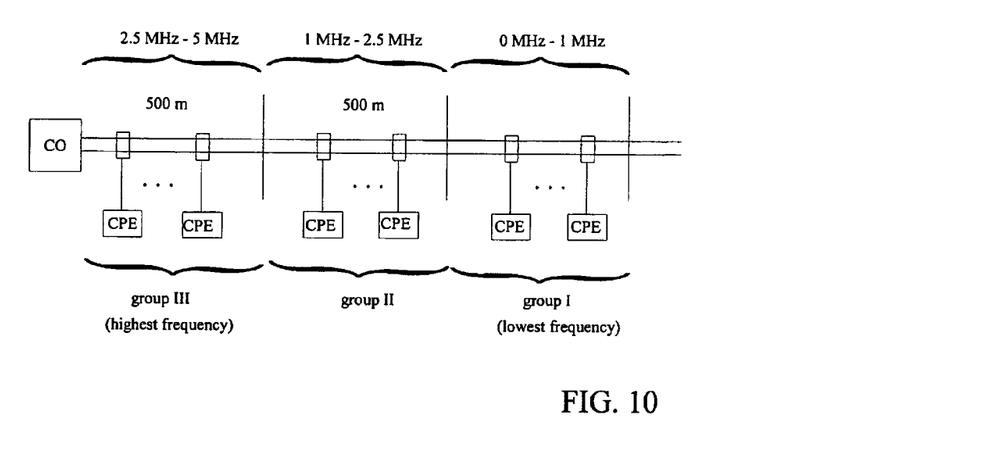

FIG. 10 illustrates a three group system. In such a system, if 100 microwatts is the desired power level at the CO for any signal, then the power attenuation span within the farthest group, group I, should be about 13 dB, because the farthest signal in the group has a power attenuation of about 40 dB and the nearest signal in the group has an attenuation of 26 dB. Attenuating the nearest signal of the farthest group by about 13 dB makes the signals of this group have equal power levels at the CO. A 0 dB filter in the passband is used for this group because no more attenuation is needed at the CO.

The farthest signal in the middle group, group II, has an attenuation of about 40 dB at 2.5 MHz to the CO and the nearest signal of that group has an attenuation of 20 dB. Attenuation within the group should span 0 dB (for the farthest CPE in the group) to 20 dB (for the nearest CPE in the group) so that equal power signals arrive at the CO. A 0 dB filter in the passband is used for this group because the signal is sufficiently attenuated compared to the signals from group I.

The farthest signal in the nearest group, group III, has an attenuation to the CO of 30 dB at 5 MHz and the nearest signal of that group has an attenuation of 10 dB to the CO if it is not too close to the CO. Within this group there should be a power attenuation spanning 10 dB (for the farthest CPE in the group) to 30 dB (for the nearest CPE in the group). No filter is used for this group.

While the above example is simplified, it clearly indicates that by a proper choice of frequency ranges and power attenuation among and within the selected groups, equal power levels can be achieved at the CO point, thereby minimizing far end crosstalk.

Although the present invention has been described in considerable detail with reference to certain preferred versions thereof, other versions are possible. Therefore, the spirit and scope of the appended claims of the invention should not be limited to the description of the preferred versions contained herein.

What is claimed is:

1. A method of communication between a plurality of subscriber sites and a central office via multipair subscriber loop cables that carry signals between the central office and the sites, the method comprising:

separating a plurality of subscriber loop pairs into a plurality of frequency groups, each frequency group spanning a distance along the cable that requires no more than a predetermined range of power attenuation to be applied to the signals from the sites within the group to equalize signal power from each site within the group;

assigning frequency bands to the frequency groups such that groups farther from the central office have lower frequency bands than groups closer to the central office;

assigning an analog electronic lowpass filter at the central office for each frequency group, except the frequency group closest to the central office, each filter having a passband that provides any needed attenuation to the signals of the frequency group and a stopband that substantially attenuates frequencies from the other frequency groups;

transmitting a signal from a site within a frequency group, the signal having a power attenuation based on its position within the group, and a frequency within the frequency band assigned to the group; and receiving the signal from the site within the frequency group by applying the filter assigned at the central office to the signal, unless the signal is in the frequency group closest to the central office.

2. A method as recited in claim 1, wherein the least attenuation of the predetermined range of attenuation is applied to the signal in the group that is farther from the central office and the most attenuation of the predetermined range is applied to the signal in the group that is closer to the central office.

3. A method as recited in claim 1, wherein the predetermined range of attenuation is approximately 0 dB to 30 dB; and wherein 0 dB attenuation is applied to the signal in the group that is farther from the central office and up to about 30 dB attenuation is applied to the signal in the group that is closer to the central office.

4. A system for providing communication between a plurality of subscriber sites and a central office, the system comprising:

a multipair subscriber loop cable for carrying signals between the central office and the plurality of subscriber sites, the plurality of subscriber sites being separated into a plurality of frequency groups, the frequency groups nearer to the central office having a higher frequency band than frequency groups farther from the central office, and each frequency group spanning a distance along the cable that requires no more than a predetermined range of power attenuation to be applied to the signals from the sites within the group to equalize signal power from each site within the group;

a plurality of filters for use in the central office, each of the plurality of frequency groups, except the frequency group closest to the central office, having a filter with a stopband that substantially attenuates frequencies from the other frequency groups and a passband that passes frequencies of the group, the passband of the filter providing any needed attenuation to the signals of the frequency group so that signals from any frequency group have approximately equal signal power at the central office; and a transmitter at each site, the transmitter including an attenuator for attenuating transmit power depending on the position of the site within a frequency group such that the transmit power from each site within the group is approximately equal.

5. A system as recited in claim 4, wherein the least attenuation of the predetermined range of attenuation is applied to the signal in the group that is farther from the central office and the most attenuation of the predetermined range is applied to the signal in the group that is closer to the central office.

6. A system as recited in claim 4, wherein the predetermined range of attenuation is approximately 0 dB to 30 dB; and wherein 0 dB attenuation is applied to the signal in the group that is farther from the central office and up to about 30 dB attenuation is applied to the signal in the group that is closer to the central office.

* * * * *